Patented Mar. 8, 1949

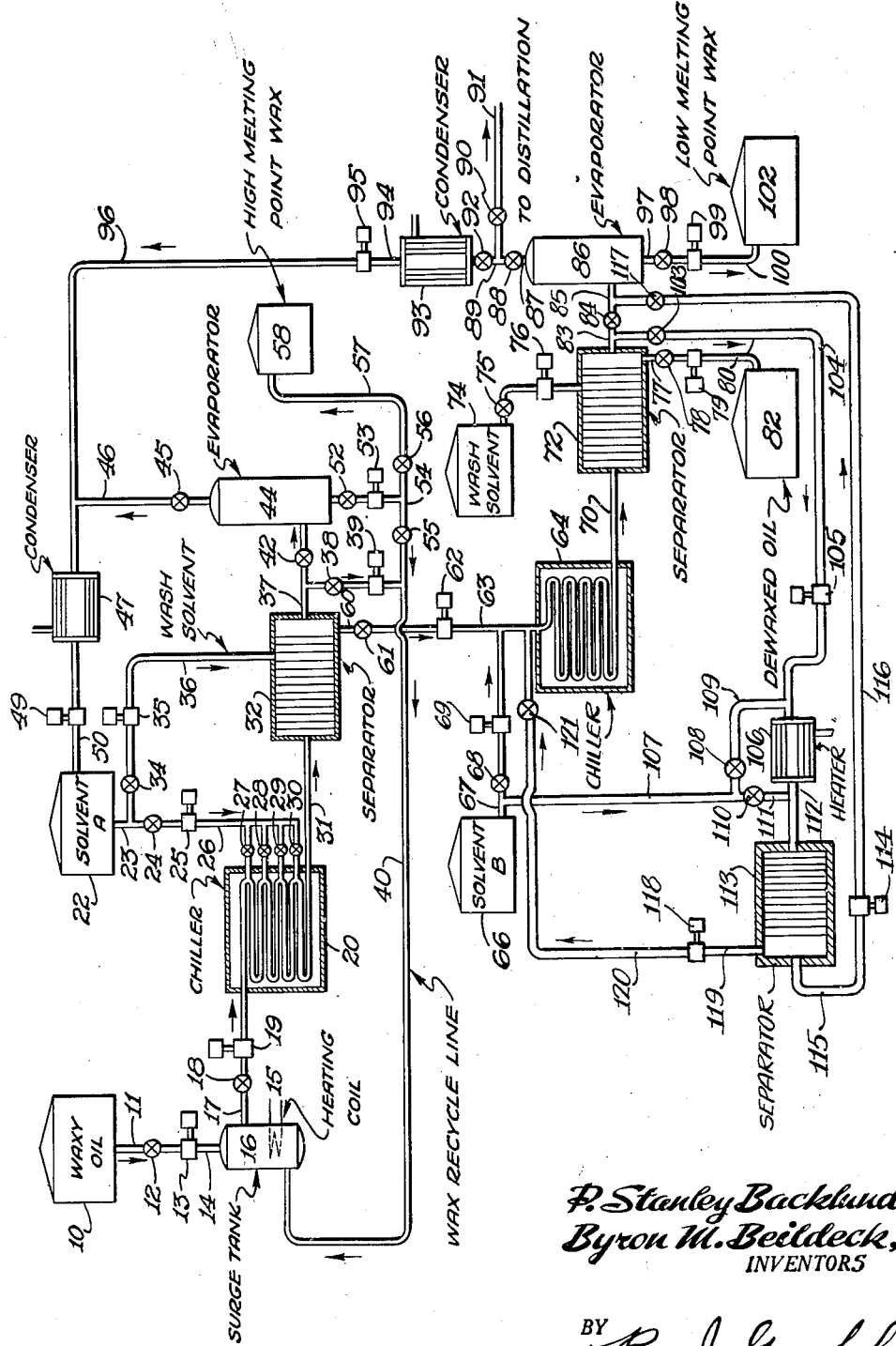

2,463,845

UNITED STATES PATENT OFFICE 2,463,845

PROCESS FOR SEPARATING WAX FROM OIL

Peter Stanley Backlund and Byron M. Beildeck, Los Angeles, Calif., assignors to Union Oil Company of California, Los Angeles, Calif., a corporation of California Application February 6, 1945, Serial No. 576,479

6 Claims. (Cl. 196—18)

This invention relates to the separation of oil and wax from wax-oil mixtures such as waxy oils or oily waxes. The invention relates particularly to a process for separating wax and oil from a wax-oil mixture to produce a low pour point oil and high melting point wax.

In a conventional process for separating wax from oils, the oil is dissolved in a solvent or a mixture of solvents at an elevated temperature and the solution then chilled to a sufficiently low temperature to bring about the precipitation of the wax which may be subsequently removed by filtration, centrifuging or the like. The solvents employed in this process are those which show a preferential solubility for oil over wax at the dewaxing temperature, such as various mixtures of benzene and acetone, benzene and methyl ethyl ketone, propane, naphtha and the like. These solvents, being very fluid at low temperatures reduce the viscosity of the oil to such an extent that very low temperatures may be employed during the filtration and as a result low pour point oils will be obtained. In this method of dewaxing, washing of the wax cake on the filter with fresh cold solvent is usually carried out. However, the type of wax cake obtained in the operation wherein the wax is precipitated out from a solvent-oil mixture by chilling is very voluminous, and susceptible to cracking during washing, retaining a large percentage of solvent and oil and because of its structure is difficult to wash free thereof. It is not unusual for the wax cake obtained in this type of operation to contain as much as 60% by weight of oil after removal of solvent. The weight of solvent present in the so-called dry cake is usually from two to four times that of the wax present. With many types of oils and solvents, it is necessary to add crystallization modifiers to the oil before chilling the waxy-oil solution in order to obtain a slurry which may be filtered or otherwise separated at an economical rate.

The wax thus obtained being a composite of the entire wax content of the oil processed and containing, as pointed out above, large percentages of oil and solvent must be further treated in a deoiling process to remove said oil and to yield a marketable wax. Further, if it is desired to resolve the wax thus obtained into a high melting point wax and a low melting point wax, it is necessary by recrystallization or filtration to fractionate this material.

A more recent advancement in the art of dewaxing of oils or deoiling of waxes, involves what may be termed the limited dilution principle and is often referred to as a "reverse" dewaxing process. This process consists essentially of chilling the wax-oil mixture prior to the addition thereto of all of the necessary solvent required for efficient filtration which chilling may be accomplished in one or more stages with intermediate addition of predetermined proportions of the desired solvent at each stage. By operating in this manner very little of the crystallized wax will be redissolved by the solvent and a slurry is formed which filters very rapidly, yielding a more compact wax cake which will not crack during filtration or while washing with the solvent. In this manner it is possible to separate high melting point waxes, i. e. having an A. S. T. M. melting point above about 130° F., from a wax-oil mixture in the form of large, well-defined, oil-free crystals which will result in the production in the initial stage of the operation of high melting point wax containing less than 1% of oil. In the second stage of such operation the solvent-oil mixture is further chilled and filtered yielding a low oil content, low melting point wax, i. e. below about 130° F. melting point and a wax-free low pour point oil. This type of operation, and the many modifications thereof are described fully in United States Patent No. 2,229,658.

The advantages of this "reverse" dewaxing or deoiling process are immediately apparent for its simplicity of operation and quality of the products obtained. However, we have found that when employing stocks of comparatively low wax content, as for example, below about 10% of high melting point wax, considerable difficulty is experienced in producing therefrom a low pour point oil and an oil-free wax. Many Eastern and Mid-Continent wax-oil fractions, and particularly those which have been steam refined, are found to fall into this category. The difficulty encountered in processing these stocks by the "reverse" process consists of the formation on the filter and particularly on rotary filters of only a thin non-porous cake of wax, which is not only difficult to remove from the filter, but also tends to give poor filterability and a high oil content.

It is therefore an object of our invention to separate wax-oil mixtures into their constituent components in a simple and economical manner.

It is a more particular object of our invention to efficiently separate wax-oil mixtures which by virtue of their relatively low wax content are difficult to separate by conventional methods.

An important object of our invention resides in forming within the wax-oil mixture of low wax content the same type of desirable wax-crystal structure developed when crystallization occurs in a wax-oil mixture of higher wax content, which crystallization is brought about in the solvent-wax-oil mixture of lower solvent content than that required for efficient filtration.

It is a further object of the invention to alter the normal crystallization characteristics of low wax content wax-oil mixture so that upon filtration a sufficiently thick wax cake will be formed to facilitate washing and handling thereof and which wax cake will have a low content of entrained oil.

Other objects and advantages of our invention will occur to those familiar with the art as the description thereof proceeds.

We have discovered that an improved wax cake may be obtained in the "reverse" dewaxing process as described above when employing low wax content oil-wax mixtures if a certain proportion of deoiled wax is recycled to the incoming stream of hot oil and wax before the chilling and the addition of solvent. This mixture when chilled with the addition of solvent in one or more similar increments in accordance with the limited dilution principle of the "reverse" dewaxing process of the above-mentioned patent, filters to give the highest yield of wax of the lowest oil content of any method known to us. It is important to point out that this wax which is recycled to the hot oil wax charge may be derived directly from the filtration operation containing therefore a comparatively large quantity of solvent, or it may be recycled after the evaporation of the solvent therefrom. In either case equally satisfactory results are obtained. The essence of the effectiveness of our invention lies not alone in the formation of a thicker wax cake as might be obtained by recycling of wax to the filtering operation but in the change effected in the crystallization characteristics of the wax during the chilling step. Thus if wax is recycled to the filtration step no change in the crystal structure and resultant type of filter cake formed by the wax in the previously chilled oil-wax mixture is brought about, and as a consequence the filter cake, whereas it may be made to be thicker, would nevertheless possess the same undesirable properties, dense structure and high oil content. On the other hand, we have found that if this wax is recycled to the initial step of the operation and it is therein redissolved in the hot oil-wax mixture to augment the low wax content of the original feed, crystal formation upon chilling and solvent dilution, and subsequent filtration, will be considerably improved and simplified and the ease and efficiency will correspond to the treatment of a stock originally containing a higher content of high melting point wax such as for example from 15% to 30%.

As solvents for carrying out our process, that is, when the solvent is added to the wax-oil mixture after partial or total crystallization of the wax, we may employ such poor wax solvents as methyl ethyl ketone, butyl, amyl or propyl alcohol or mixtures thereof; various esters such as ethyl acetate, ethers such as diethyl ether or isopropyl ether, chlorinated hydrocarbons such as ethylene dichloride, trichloroethylene, and other ketones such as acetone, methyl n-propyl, methyl isopropyl ketone, methyl isobutyl ketone, ethyl isopropyl ketone, methyl n-butyl ketone, and the like. In cases where high viscosity index oils are to be treated we may employ a mixture of benzene or naphtha or an aromatic solvent and any of the above solvents in order to obtain miscibility of the oil with solvents at the temperature of the second or dewaxing stage. For example, we have found that a solvent consisting of 40% toluene, 30% methyl ethyl ketone, and 30% methyl isobutyl ketone is an excellent solvent for the second stage dewaxing and the presence of the toluene is not detrimental for the deoiling stage because of the presence of the higher ketone, although its presence does not aid in the deoiling, and may therefore be carried through with the oil in both stages eliminating the necessity of its removal from the oil or the addition to the oil of a different solvent prior to the second stage of the operation. Other solvent mixtures which we have employed successfully are for example a mixture comprising from 20% to 30% trichloroethylene plus a mixture of 50% methyl ethyl ketone and 50% methyl isobutyl ketone; or a solvent comprising 20% trichloroethylene and 80% methyl isobutyl ketone; or a solvent comprising 40% benzene, 30% methyl ethyl ketone and 30% methyl isobutyl ketone. The last mentioned solvent is not as effective for the dewaxing step as our first mentioned solvents since the yield of low pour oil is somewhat lower. Whereas, solvents containing trichloroethylene as mentioned above are very good for both stages of the operation a certain amount of difficulty is encountered in the recovery of trichloroethylene due to hydrolysis occurring on stripping with steam. The examples are not meant to limit our invention to the solvents employed inasmuch as any of the above-mentioned materials or mixtures thereof may be employed in the process.

In order to avoid confusion in the terminology of the following description we will refer to the first stage of our process as a deoiling step inasmuch as the prime importance thereof is the production of a high melting point, oil-free wax. Also we will refer to the second stage of our process as a dewaxing step inasmuch as although the low melting point wax obtained therefrom may be commercially valuable the low pour point, wax free oil is the more important product.

It is sometimes desirable depending upon the characteristics of the particular feed stock to be treated to employ in the initial or deoiling step of our process a solvent which is not adequate for the second or dewaxing step of our process. Such a condition, for example, gives rise to two alternative methods of procedure. In one and perhaps the most desirable method wherein a solvent is employed in a deoiling step which does not have a sufficiently high oil solubility to dissolve the oil at the relatively lower temperatures of the dewaxing step, the solvent can be modified at an intermediate point between the two stages of the process by the addition thereto of a predetermined proportion of an aromatic hydrocarbon, petroleum naphtha, halogenated hydrocarbon or any solvent having the effect of materially increasing the solubility of the oil in said solvent at the low dewaxing temperatures. In the second method we may by simple distillation remove the solvent from the oil after the deoiling step and proceed with the dewaxing step according to the conventional dewaxing process as hereinbefore described, wherein we may employ as solvents liquefied normally gaseous hydrocarbons such as ethane, ethylene, propane, propylene, butane, isobutane, butylene or mixtures thereof, or we may use other normally gaseous diluents such as methyl ether, methyl chloride and dichlor-difluor-methane. These materials in addition to diluting the oil so as to permit rapid filtration, also have the desired property of chilling the wax-oil mixture when evaporated from the solution under reduced pressure. Also if desired normally liquid solvents may be employed such as those hereinbefore listed.

The method of operation of the process according to our invention may perhaps be better understood by reference to the description of the drawing. Referring to the drawing, a waxy stock such as for example a steam refined Louisiana bright stock or other raw distillates or raffinates, containing a comparatively small percentage of wax is maintained in tank 10 at a temperature sufficiently high to effect solution of the wax contained in the oil, such temperature for example, may be around about 150° F. This stock is drawn from tank 10 via line 11 controlled by valve 12 and pumped by pump 13 through line 14 into surge tank 16. This surge tank or a similar vessel is employed for commingling the charged and the recycled wax at a temperature sufficient to effect complete solution of the recycled wax in the oil and for this purpose may be equipped with a heating coil 15 to maintain the temperature of the mixture sufficiently high to accomplish this end. The wax enriched oil is drawn from surge tank 16 via line 17, controlled by valve 18 and pumped by pump 19 into the double walled scraped chiller 20 wherein the charge is cooled from the initial temperature of about 150° F. to from 35° F. to 50° F. accompanied by the addition thereto, in one or more successive operations, of the desired solvent. The solvent is taken from tank 22 through line 23 controlled by valve 24 and pumped by pump 25 through line 26 wherein it may be injected into the feed within the chiller by means of the manifold valves 27, 28, 29 or 30. In one specific embodiment of the process for example, a feed may be cooled in the initial step to a temperature of about 120° F., at which time a quantity of the solvent as for example about 20% based on the wax-oil feed may be injected into said feed through valve 27. The partially diluted stock is further cooled to a temperature of about 90° F. whereafter a further quantity as for example about 20% of solvent is added thereto through valve 28, whereafter the stock is further chilled to about 75° F. and there is added thereto through valve 29 another 20% of solvent based on the feed and upon final chilling to about 40° F. or 50° F. the remainder of the solvent is added thereto through valve 30. When the addition of the solvent to the feed is made in this manner it is necessary to heat or cool said solvent as the case may be to a temperature corresponding to the temperature of the stock at the particular time of addition. It is to be understood that this addition may be made in any desired manner or sequence or it may be made at one time after the chilling has progressed to a desirable point.

The thus chilled diluted stock now in the form of a slurry passes from the chiller 20 through line 31 into separator 32 which separator may be any type desired such as for example a rotary filter. The filter cake built up thereon is washed with further quantities of the solvent, taken from tank 22 via line 23, controlled by valve 34 and pumped by pump 35 through line 36 into separator 32. This wash solvent is introduced into the separator at the temperature of the slurry. The discharged filter cake is drawn from the separator through line 37 wherein it may be divided into two streams by valves 38 and 42. As hereinbefore pointed out, a portion of the wax may be recycled to the initial feed stock and in this case to surge tank 16 prior to the evaporation of the solvent therefrom which recycling may be accomplished by pumping the desired proportion of the wax withdrawn from the separator through line 37, and valve 38 by pump 39 through line 40 returning to surge tank 16. In this case the remaining portion of the wax is discharged through valve 42 into evaporator 44 wherein the solvent is evaporated from the wax passing overhead through valve 45 and line 46 into condenser 47 whereafter it is pumped by pump 49 through line 50 into the solvent storage tank 22. The solvent free wax is withdrawn from evaporator 44, through valve 52 and pumped by pump 53 through line 54, valve 56 and line 57 into the high melting point wax storage tank 58. In the second method of operation at this point valve 38 remains closed and the entire wax discharged from the separator passes through valve 32 to evaporator 44 wherein the solvent is evaporated from the wax returning to solvent tank 22 as described above, and the solvent free wax is drawn from evaporator 44 through valve 52 and is pumped by pump 53 into line 54 wherein the stream is split part of which passes through valve 55 and line 40 back to surge tank 16 to furnish the recycle wax, the remainder passing through valve 56 and line 57 to the high melting point wax storage tank 58.

Returning to separator 32, the filtrate which still contains low melting point waxes is withdrawn through line 60 controlled by valve 61 and is pumped by pump 62 through line 63 into a second chiller 64. As hereinbefore pointed out depending upon the type of solvent used in the deoiling step of the operation, it may be necessary to add to the stock prior to the dewaxing step of the operation an additional amount of a solvent such as an aromatic hydrocarbon, petroleum naphtha, halogenated hydrocarbon or the like to effect the solution of the oil at the lower temperatures of operation of the dewaxing step. This solvent hereinafter referred to as solvent "B" to distinguish it from the solvent referred to as solvent "A" in the initial stage of the operation is withdrawn from storage tank 66 through line 67 controlled by valve 68 and pumped by pump 69 into line 63 where it is commingled with the stock passing to the second operation. If, however, the solvent "A" employed in the deoiling operation is of such composition as to be a satisfactory solvent for the oil at the temperatures of the dewaxing operation, this addition is unnecessary. In either case the diluted stock passes from line 63 into chiller 64 wherein it is further cooled to a temperature in the neighborhood of from about 0° F. to about —15° F. passing therefrom through line 70 into separator 72 which can be any desirable type of separator such as for example a rotary filter. In case there has been no subsequent addition of solvent between the deoiling and dewaxing steps of the operation the wash solvent for the filter cake obtained in separator 72 may be taken directly from the storage tank 22 containing the initial solvent "A." However, if as described, additional solvent is added from tank 66 intermediate between the two stages it is necessary that the wash solvent be of the same composition as the final diluent entering chiller 64 in the dewaxing stage. In the latter case the wash solvent stored in tank 74 is drawn via line 75 chilled to temperature of separation and pumped by pump 76 into separator 72 to effect the washing of the wax cake.

In the conventional dewaxing procedure the wax is withdrawn from separator 72 via line 83 controlled by valve 84 passing through line 85 into evaporator 86 wherein the solvent is evaporated from the wax passing overhead through line 87 controlled by valve 88 and providing it is of the composition of the original solvent it is passed through valve 92 into condenser 93, is pumped by pump 95 from the condenser through line 94 and line 96 back to the storage of solvent "A" in tank 22. If, however, the solvent is of different composition than solvent "A" brought about as described previously by the addition of solvent "B" prior to the dewaxing step of the operation it is passed through line 89, controlled by valve 90 and through line 91 to a distillation process wherein the solvent is resolved into solvent "A" and solvent "B." This distillation process is not shown inasmuch as it does not effect the invention and its construction will be dependent solely upon the composition of solvent "A" and solvent "B" and the necessary facilities for the resolution thereof.

A solvent free slack wax is withdrawn from evaporator 86 through line 97 controlled by valve 98 pumped by pump 99 through line 100 into the low melting point wax storage tank 102.

The dewaxed low pour point oil obtained as a filtrate in separator 72 is withdrawn therefrom through line 77 controlled by valve 78 and pumped by pump 79 through line 80 into storage tank 82.

We have, however, discovered a method of modifying this dewaxing step whereby we are able to obtain a higher yield of low pour point oil and an essentially oil-free low melting point wax. In the conventional process as described the wax having a melting point of about 103° F. as obtained from separator 72, after removal of the solvent therefrom in evaporator 86, contains as much as 10% to 20% oil which may be recovered therefrom by means of our modification of the process.

After removal of the wax cake from separator 72 and prior to introducing it to evaporator 86 we may withdraw the wax cake through valve 103, line 104 and pump 105 from which it passes into heater 106 where the wax is heated to a temperature of 30-35° F. Additional solvent is mixed with the wax either before heating or immediately following the heating. The solvent may be obtained from tank 66 by passing it through lines 67 and 107, thence either through valve 108 and line 109, if it is to be added before the wax is heated, or through valve 110 and line 111, if it is to be added subsequent to the heating operation. The mixture of wax and solvent is passed through line 112 into separator 113. The wax cake is withdrawn from separator 113 by means of pump 114 through lines 115 and 116, controlled by valve 117 and returned to line 85 from which it passes into evaporator 86. The filtrate containing very low melting point wax and oil is withdrawn from separator 113 by means of pump 118 through lines 119 and 120, controlled by valve 121 and passed into line 63 wherein it is mixed with the incoming feed prior to passing through chiller 64. The effect of this operation is to recover from the slack wax, obtained in the dewaxing step, an oil-free wax with a resultant increase in the yield of wax-free low pour point oil obtained from separator 72. It should be pointed out that we have found that the heating of the wax cake to 30-35° F. is an essential element for the successful operation of our modified process. Simple reslurrying of the wax cake from separator 72 with additional amounts of solvent without raising the temperature of the slurry makes the subsequent tertiary filtration ineffectual, no oil-free wax being obtained, and as a result the yield of dewaxed oil is not improved.

Because of the build up of very low melting point wax in the system resulting from this modified method of procedure it becomes necessary at intervals to by-pass this tertiary filtration and proceed as shown in the drawing to evaporator 86. After a short period of total production of slack wax in this manner the system becomes cleared of the low melting point wax build up and the modified procedure may again be employed.

If for example in the process according to the drawing, 1,000 barrels per day of a steam refined Louisiana bright stock containing about 6.4% high melting point wax and about 9.7% low melting point wax were withdrawn from tank 10 and charged to surge tank 16 following therefrom through the process the amount of recycle high melting point wax passed through line 40 into tank 16 would be in the neighborhood of about 250 barrels per day. Passing from surge tank 16 into chiller 20 wherein solvent "A" such as for example consisting of 40% toluene, 30% methyl ethyl ketone and 30% methyl isobutyl ketone is added to the feed in the ratio of about 3.1 to 1 based on the original charge or about 2.5 to 1 on the basis of the original charge plus the recycle wax and proceeding through separator 32 into evaporator 44 the production of wax of a melting point of 166° F. is approximately 64 barrels per day. After passing through the second stage of the process a net yield of between 810 and 815 barrels per day of oil with a pour point of 5° F. or less is obtained together with approximately 121 barrels per day of a slack wax melting in the neighborhood of 105° F.

As pointed out above this low melting point wax produced in the dewaxing stage of the process may contain anywhere from 10% to 30% of oil, but by employing our modification of the dewaxing stage an oil-free wax is obtained melting at about 112° F. and as a result an additional 12 to 35 barrels per day of low pour test oil is produced.

It is apparent that the process of our invention which consists of recycling a portion of the high melting point wax as obtained in the initial stage of the "reverse" deoiling-dewaxing process having the effect of increasing the wax content of comparatively low wax content wax-oil mixtures has many advantages over the use of such process of low wax content distillates wherein recycle is not employed. The amount of wax recycled to the initial stage of the operation is a function not only of the wax content of the initial charge but also of the optimum wax content of the final mixture to be fed to the chiller. Although the limits for the recycle of finished wax may not be closely defined they are usually in the range from about 10% to about 20% added wax depending upon the wax content of the original crude waxy stock. On the basis of our work we have found that best results are obtained if the total high melting wax content of the charge to be treated, after the recycle of the oil-free wax to the crude wax-oil stock is from about 15% to about 35% and preferably from about 20% to about 30% based on the crude wax plus added wax.

Examples of our process will serve to further emphasize the advantages which may accrue from its use.

EXAMPLE I

A Mid-Continent bright stock raffinate was dewaxed by the conventional method and by the process of our invention as follows:

Run No. 1 was made by completely dissolving the waxy raffinate in 3.4 volumes of solvent consisting of methyl isobutyl ketone at 140° F. It was subsequently chilled to 50° F. and filtered to yield 4.2% of 172° F. A. S. T. M. melting point wax. In this run it was necessary to scrape the wax cake off of the filter mechanically since it was too thin to discharge properly. It was subsequently found that a longer filter time made no appreciable difference in the thickness or characteristics of the wax cake formed due apparently to the nature of the wax crystals precipitated in the chilling step.

A second run was made on the same stock employing the principles of our invention by blending 20% of 166° F. melting point wax with the raffinate. The raffinate and added wax were heated to 140° F. to effect the complete solution of the wax in the oil whereupon it was chilled to 50° F. while adding small increments of the solvent as follows: 20%, based on the wax-oil feed at 120° F., 20% at 90° F., 20% at 75° F., and the remainder at 50° F. to give a solvent raffinate ratio of 3 to 1 based on the raffinate charged or 2.5 to 1 based on the raffinate plus added wax. The resulting slurry was filtered to yield 25.1% of 166° F. melting point wax based on the charge or 6.4% based on the raffinate present representing an increase of approximately 34% in the recovery of high melting point wax from the original stock. In addition to the increased recovery the recycling of the wax greatly facilitated the filtering of the slurry which may be seen more clearly in the following table.

Table I

| Run number | 1 | 2 |
|---|---|---|
| Solvent composition | Methyl Isobutyl Ketone | |
| Method of chilling | Complete dilution | Limited dilution. |
| Temperature of filtration, °F. | 50° F | 50° F. |
| Vacuum on filter pick up, mm. Hg. | 8 | 5. |
| Filter rate, lbs. of wax/sq. ft./hr. | 1.0 | 2.0. |
| Solvent wet cake, weight per cent of charge. | 8.46 | 56.4. |
| Yield of deoiled wax, weight per cent of charge. | 4.2 | 25.1. |
| A. S. T. M. melting point of wax. | 172 | 166. |
| Per cent yield based on raffinate. | 4.2 | 6.4. |

It should be pointed out that the conditions chosen for run No. 1 were those that were felt to give the best comparative results with the recycle process employed in run No. 2. In attempting to employ the limited dilution principle on this and other low wax content stocks without the use of wax recycle no satisfactory product could be obtained and for this reason it was necessary to employ the complete dilution method of operation.

In the second or dewaxing step of the process the foots oil from the recycle deoiling run above was dissolved after removal of the methyl isobutyl ketone in a solvent consisting of 40% toluene, 30% methyl ethyl ketone and 30% methyl isobutyl ketone. We have found this solvent to be excellent for both the deoiling and dewaxing steps of our process but in this particular instance the deoiling step and dewaxing step were carried out independently of each other using the different solvent in each case. The foots oil is completely soluble in this solvent at 50° F. the temperature at which it is discharged from the filter of the deoiling stage. This solution was subsequently chilled to −5° F. and filtered yielding 87.05% of solvent free oil. The wax cake was repulped at 35° F. in accordance with the principles of our modified dewaxing procedure as hereinbefore disclosed in the presence of an added quantity of solvent and filtered to yield 6.9% of oil free wax with an A. S. T. M. melting point of 112° F. The filtrate was recycled to the initial stage of the dewaxing step wherein it was again chilled to −5° F. and filtered again yielding an additional 2.6% of low pour point oil and 3.4% of 90° F. melting point wax. These values may be summarized and compared to the two stage process in which wax recycle was not employed in the deoiling step and the conventional dewaxing step in which no repulping of slack wax from secondary filtration was employed.

Table II

| | Recycle Deoiling and Modified Dewaxing | Conventional Deoiling-Dewaxing |
|---|---|---|
| Yield of high melting point wax, wt. percent | 6.4 | 4.2 |
| Yield of 5° F. pour point oil, wt. percent | 83.9 | 81.5 |
| Yield of low melting point wax | ¹ 9.7 | ² 14.3 |

¹ 6.4% 112° F. and 3.3% 90° F. melting point oil-free waxes.
² Slack wax containing approximately 20% oil and melting at 105° F.

EXAMPLE II

Another series of deoiling runs were made on an Eastern low wax content stock to compare the methods of operation. In the first run 400 volumes of waxy raffinate was combined with 100 volumes of wax of 166° F. melting point which dissolved in the raffinate at the initial operating temperature of 140° F. This solution was chilled to 40° F. adding solvent consisting of 40% toluene, 30% methyl ethyl ketone and 30% methyl isobutyl ketone as follows: 10% based on the feed at 125° F., 10% at 90° F., 20% at 60° F. and the remainder at 40° F. to give a solvent to feed ratio of 3.0 to 1. This slurry was filtered at 40° F., the cake was washed to yield 24.1% of wax of 167° F. melting point based on the charge or 6.53% based on the waxy raffinate, which represents a filter rate of 2.2 pounds of solvent free wax per square foot of filter space per hour or 0.62 pound of product wax per square foot per hour.

In the second of these runs 50 volumes of wax-oil feed was dissolved in 150 volumes of the solvent and the mixture chilled to 40° F. and filtered to give 6.2% wax of 167° F. melting point. The filter rate in this run, in which no wax recycle was employed was only 0.53 pound of solvent free wax per square foot of filter area per hour.

These examples are illustrative of the process of our invention but are not meant to limit its scope as many modifications thereof will occur to those skilled in the art without departing from the principles of the wax recycling in the deoiling stage or the repulping in the dewaxing stage as set forth in the following claims.

We claim:
1. In a two stage process for separating wax- oil mixtures which comprises a deoiling step and a dewaxing step, the deoiling step comprising bringing said mixture to a state wherein the wax is substantially completely dissolved in the oil, cooling said wax oil solution in the absence of any substantial amount of diluent to a temperature sufficiently low to crystallize a portion of the wax and to produce a mass which is fluid at said cooling temperature, commingling said cooled fluent wax-oil mass with a solvent at substantially the same temperature as said wax-oil mixture to dissolve the oil present, and separating a filtrate comprising the solvent solution of oil from the crystallized wax, the improvement comprising recycling a portion of said separated crystallized wax to the initial stage of the operation wherein said wax is redissolved in the oil-wax charge thereby increasing the wax content of said charge, the dewaxing step comprising further chilling the filtrate from the deoiling step of the operation so as to crystallize the low melting point wax therein, separating the wax from the oil-solvent mixture in an initial separator, the improvement comprising repulping said low melting point wax at a temperature substantially above the dewaxing temperature in the presence of additional amounts of solvent, separating the wax from a filtrate comprising the oil-solvent solution in a secondary separator to give a substantially oil-free wax of higher melting point than the wax obtained directly from said initial separator in the dewaxing step and recycling the filtrate from this secondary separator to the chiller in the dewaxing step, and recovering a substantially wax free, low pour point oil from the initial separation.

2. In a process for separating wax-oil mixtures which comprises the chilling of said wax-oil mixtures in the presence of a diluent so as to crystallize substantially all of the wax contained therein, separating the wax from the oil-solvent mixture in an initial separator, the improvement comprising repulping the said separated wax at a temperature substantially above the temperature of said initial separation in the presence of additional amounts of diluent, separating the resultant wax-oil solvent mixture in a secondary separator to give a substantially oil free wax of higher melting point than the wax obtained directly from said initial separation, and recycling the separated oil from said secondary separation to the incoming feed stream, and recovering a substantially wax free low pour point oil from said initial separation.

3. A process as in claim 1 wherein the solvent employed in the deoiling step is recovered from the filtrate from the deoiling step comprising the solvent solution of oil separated from crystalline wax and a secondary solvent is added to the solvent free oil prior to the dewaxing step.

4. A process as in claim 1 wherein the filtrate from the separation stage of the deoiling step, which is a filtrate comprising the solvent solution of oil separated from the crystallized wax, is further diluted with an oil solubility increasing compound prior to the dewaxing step.

5. In a two-stage process for separating wax-oil mixtures which comprises a deoiling step and a dewaxing step, the deoiling step comprising bringing said mixture to a state wherein the wax is substantially completely dissolved in the oil, cooling said wax-oil solution to a temperature sufficiently low to crystallize a portion of the wax and to produce a mass which is fluid at said cooling temperature, commingling said cooled fluent wax-oil mass with a solvent at substantially the same temperature as said wax-oil mixture to dissolve the oil present, which solvent comprises a major proportion of at least one ketone characterized by the presence of from 5 to 6 carbon atoms in its molecular structure and at least one ketone characterized by the presence of from 3 to 4 carbon atoms in its molecular structure and a minor proportion of a compound selected from the class of compounds consisting of aromatic hydrocarbons, petroleum naphthas and halogenated hydrocarbons, and separating a filtrate comprising the solvent solution of oil from the crystallized wax, the improvement comprising recycling a portion of said separated crystallized wax to the initial stage of the operation wherein said wax is redissolved in the oil-wax charge thereby increasing the wax content of said charge, the dewaxing step comprising further chilling the filtrate from the deoiling step of the operation so as to crystallize the low melting point wax therein, separating the wax from the oil-solvent mixture in an initial separator, the improvement comprising repulping said low melting point wax at a temperature substantially above the dewaxing temperature in the presence of additional amounts of solvent, separating the wax from the oil solvent solution in a secondary separator to give a substantially oil-free wax of higher melting point than the wax obtained directly from said initial separator in the dewaxing step and recycling the filtrate from said secondary separation to the chiller in the dewaxing step, and recovering a substantially wax-free, low pour point oil from the initial separation.

6. A process according to claim 5 wherein the solvent employed in the deoiling step comprises a mixture of at least one ketone characterized by the presence of from 5 to 6 carbon atoms in its molecular structure and at least one ketone characterized by the presence of from 3 to 4 carbon atoms in its molecular structure which solvent is modified in the dewaxing step by addition to the filtrate from the deoiling step of a minor proportion with respect to the ultimate solvent composition of a compound selected from the class of compounds consisting of aromatic hydrocarbons, petroleum naphthas, and halogenated hydrocarbons.

P. STANLEY BACKLUND.
BYRON M. BEILDECK.

REFERENCES CITED

The following references are of record in the file of this patent:

UNITED STATES PATENTS

| Number | Name | Date |
| --- | --- | --- |
| 1,881,643 | Jones | Oct. 11, 1932 |
| 2,036,188 | Anderson | Apr. 7, 1936 |
| 2,053,872 | Montgomery | Sept. 8, 1936 |
| 2,166,891 | Gee I | July 18, 1939 |
| 2,229,658 | Jenkins | Jan. 28, 1941 |
| 2,229,659 | Carr | Jan. 28, 1941 |
| 2,248,668 | Gee II | July 8, 1941 |
| 2,281,667 | Bray | May 5, 1942 |
| 2,284,607 | Marshall | May 26, 1942 |
| 2,330,740 | Pokorny et al. | Sept. 28, 1943 |